United States Patent [19]
Bard et al.

[11] Patent Number: 6,127,516
[45] Date of Patent: Oct. 3, 2000

[54] ELECTROCHROMIC MATERIAL BASED ON A CONDUCTING LADDER POLYMER

[75] Inventors: Allen J. Bard, Austin, Tex.; Jeff D. Debad, Gaithersburg, Md.

[73] Assignee: Board of Regents, The University of Texas System, Austin, Tex.

[21] Appl. No.: 09/224,553

[22] Filed: Dec. 30, 1998

Related U.S. Application Data

[60] Provisional application No. 60/070,007, Dec. 30, 1997.
[51] Int. Cl.[7] .............................. C08G 61/00; C08J 3/10
[52] U.S. Cl. .............. 528/396; 252/299.62; 252/299.63; 526/284; 524/779; 524/783; 524/785
[58] Field of Search .................... 252/299.62, 299.63; 526/284; 524/779, 783, 785; 528/396

[56] References Cited

U.S. PATENT DOCUMENTS

| | | |
|---|---|---|
| 3,881,922 | 5/1975 | Löhr et al. |
| 4,769,448 | 9/1988 | Heeger et al. |

OTHER PUBLICATIONS

International Search Report dated Mar. 23, 1999 (PCT/US98/27844) (UTFB:648P).
Allen, "Carbonyl bridge compounds", *Chem. Rev.*, 62:653–664, 1962.
Bargon et al., "Electrochemical synthesis of electrically conducting polymers from aromatic compounds", *IBM J. Res. Develop.*, 27:330–341, 1983.
Debad et al., "Anodic coupling of diphenylbenzo[κ]fluoranthene: mechanistic and kinetic studies utilizing cyclic voltammetry and electrogenerated chemiluminescence", *J. Org. Chem.*, 62:530–537, 1997.
Dilthey et al., "Hocharylierte aromatische verbindungen (vi. Mitteil.[1])", *Chem. Ber.*, 71:974–979, 1938.
Gustafsson et al., "Flexible light–emitting diodes made from soluble conducting polymers", *Nature*, 357:477–481, 1992.
*Handbook of Conducting Polymers*; Skotheim, T.A. Ed.; Marcel Dekker: New York, vol. 1, 1986.
Monk et al., *Electrochromism Fundamentals and Applications*: VCH Publishers: New York, 1995.
Novák et al., "Electrochemically active polymers for rechargeable batteries", *Chem. Rev.*, 97:207–211, 1997.
Pethrick, Conducting Polymers, In: Desk Reference of Functional Polymers Synthesis and Applications, Arshady, R, Ed., American Chemical Society: Washington, D.C., 1997.
Plummer et al., "Study of geometry effects on heavy atom perturbation of the electronic properties of derivatives of the nonalternant polycyclic aromatic hydrocarbons fluoranthene and acenaphtho[1,2-κ]fluoranthene", *J. Am. Chem. Soc.*, 115:11542–11551, 1993.
Satoh et al., "Electrochemical polymerization of naphthalene", *Chem. Soc. Chem. Comm.*, 550–551, 1986.

(List continued on next page.)

*Primary Examiner*—Samuel A. Acquah
*Attorney, Agent, or Firm*—Fulbright & Jaworski

[57] ABSTRACT

The oxidation of 7,14-diphenylacenaphtho[1,2-κ] fluoranthene (1) at platinum or indium tin-oxide electrodes leads to deposition of a polymer film on the electrode surface that displays many interesting properties including electroactivity, fluorescence, and electrochromism. Thin films of this polymer appear deep blue in the neutral state, but become pale grey upon oxidation and light green or orange upon reduction, depending upon the voltage applied. Soluble oligomers of poly(3,10-(7,14-diphenylacenaphtho [1,2-κ]fluoranthene)) are formed during oxidation of the monomer (1) via radical cation-radical cation coupling reactions and are identical to those chemically synthesized by the Ni(0)-catalyzed coupling of the 3,10-dibromo derivative of 1. Further oxidation of these oligomers leads to intramolecular coupling reactions to form ladder structures within the chains and the eventual precipitation of insoluble polymer onto the electrode. Spectroscopic and electrochemical data for the polymer film and the isolated oligomers is presented.

9 Claims, 5 Drawing Sheets

OTHER PUBLICATIONS

Schlüter et al., In: Perfect Diels–Alder Ladder Polymers: Precursors for Extended π–Conjugation In *Desk Reference of Functional Polymers Synthesis and Applications*, Arshady, R., Ed.; American Chemical Society: Washington, D.C., 1997.

Tucke, "Synthesis of fluoranthenes. Part XIII. Synthesis of benzo[1:2–a,3:4–a']– and of benzo[1:2–a, 4:5–a']–di-acenaphthylene", *Chem. Soc.*, vol.:1462–1465, 1958.

Waltman and Baargon, "Electrically conducting polymers: a review of the electropolymerization reaction, of the effects of chemical structure on polymer film properties, and of applications towards technology", *J. Can. J. Chem.*, 64:76–95, 1986.

Waltman et al., "The electrochemical oxidation and polymerization of polycyclic hydrocarbons", *J. J. Electrochem. Soc.*, 132:631–634, 1985.

Yamarnoto et al., "Electrochemical and electric properties of vacuum–deposited poly(arylene)s: electrochemical activity, diode, and electroluminescence", *Phys. Chem.*, 96:8677–8679, 1992.

SCHEME 1

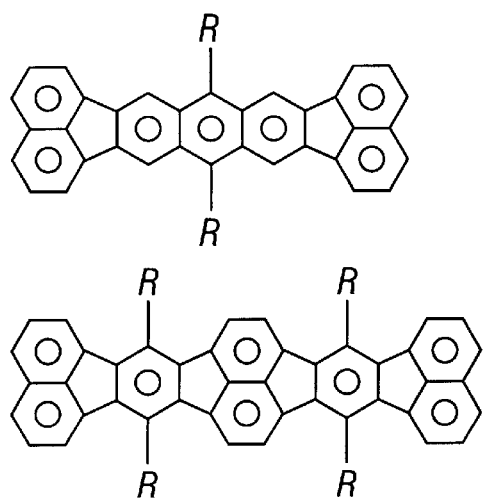
FIG. 5
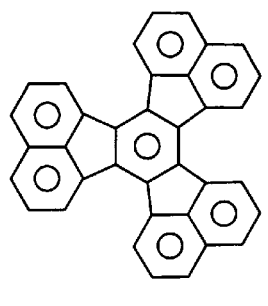
deca cyclene
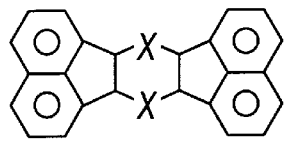
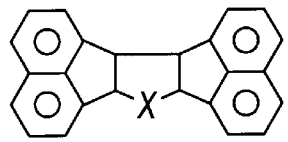
where X is S, HN or O
$R = -(CH_2)_n-CH_3$ or
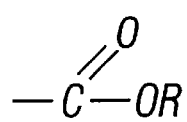
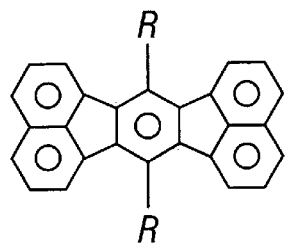
or $(R)_2$, where
$(R)_2 = $ ┌─ $(CH_2)_n$ ─┐
and n=about 1 to about 10 ALKOXY, ARYLOXY, AND Z IS ALYKYL, ARYL, OR HALIDE

ELECTROCHROMIC MATERIAL BASED ON A CONDUCTING LADDER POLYMER

The present application claims the priority of co-pending U.S. Provisional Application Serial No. 60/070,007 filed Dec. 30, 1997, the entire texts of which are specifically incorporated herein by reference without disclaimer.

The government owns rights in the present invention pursuant to grant number CHE-9508525 from the National Science Foundation.

BACKGROUND OF THE INVENTION

1. Field of the Invention

The present invention relates generally to the fields of electrically active hydrocarbon polymers.

The electropolymerization of aromatic compounds is a proven and convenient route to a number of electroactive polymers such as polythiophene, polypyrrole, and polyaniline (*Handbook of Conducting Polymers*, 1986). Many applications have been envisioned for electroactive polymers including their use as electrodes in batteries (Novák, 1997), as conductive materials (Pethrick, 1997), as electroluminescent materials (Gustafsson et al., 1992; Yamamoto, et al., 1992), and for use in electrochromic devices (Monk et al., 1995). Electropolymerization is an important synthetic technique in these fields where many materials are not processable because polymer films of varying thickness can be easily produced using this method.

Fully conjugated ladder polymers have been chemically synthesized using Diels-Alder reactions (Schlüter et al., 1997). These polymers may promise to exhibit many interesting and useful properties, and much work has been dedicated to producing pure polymers with long, uninterrupted ladder structures. Polymers of this type are highly insoluble, given their inflexible nature, and efforts to produce soluble precursors that can be chemically or thermally treated to form the ladder polymer have received much attention. The electropolymerization method described here presents an alternative route to such polymers and also a facile route to conveniently produce films of the polymer that are easily studied.

SUMMARY OF THE INVENTION

The oxidation of 7,14-diphenylacenaphtho[1,2-κ] fluoranthene (1) at platinum or indium tin-oxide electrodes leads to deposition of a polymer film on the electrode surface that displays many interesting properties including electroactivity, fluorescence, and electrochromism. Thin films of this polymer appear deep blue in the neutral state, but become pale grey upon oxidation and light green or orange upon reduction, depending upon the voltage applied. Soluble oligomers of poly(3,10-(7,14-diphenylacenaphtho [1,2-κ]fluoranthene)) are formed during oxidation of the monomer (1) via radical cation-radical cation coupling reactions and are identical to those chemically synthesized by the Ni(0)-catalyzed coupling of the 3,10-dibromo derivative of 1. Further oxidation of these oligomers leads to intramolecular coupling reactions to form ladder structures within the chains and the eventual precipitation of insoluble polymer onto the electrode. Spectroscopic and electrochemical data for the polymer film and the isolated oligomers is presented.

In an important aspect, the present invention concerns a polymer produced by the electropolymerization of a fluoranthene on a conductive surface. A preferred fluoranthene is 7,14 diphenylacenaphtho [1,2-κ]fluoranthene (1). Other fluoranthenes may include 1, 4, 9, 12 tetraphenyldiacenaphthol [b,p]periflanthene (4). Even fluoranthene oligomers such as poly (3,10-(7,14-diphenylacenaphtol [1,2-κ] fluoranthene)) may be used. The conductive surface upon which polymerization films are formed according to the present invention are many but are preferably as conductive and suitably inert as platinum or indium tin oxide. These polymers are generally fluorescent, electrochromatic and/or electroactive. A preferred general aspect of the fluoranthene utilized from the polymers of the present invention is shown in FIG. 5. In one preferred aspect, the polymer of the present invention is an electroactive and electrochromatic hydrocarbon polymer having the structure:

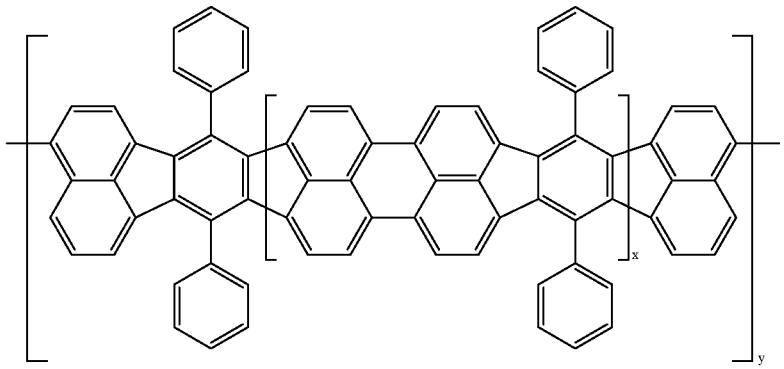

where x and y are independently from about 2 to about 100. Such ladder polymers have unique structures and electroactive properties.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

3B) polymer growth during repeated oxidation cycles, and (FIG. 3C) a thin film of the resulting polymer deposited on a platinum electrode in MeCN, 0.1 M TBAPF$_6$.

Figure 4:
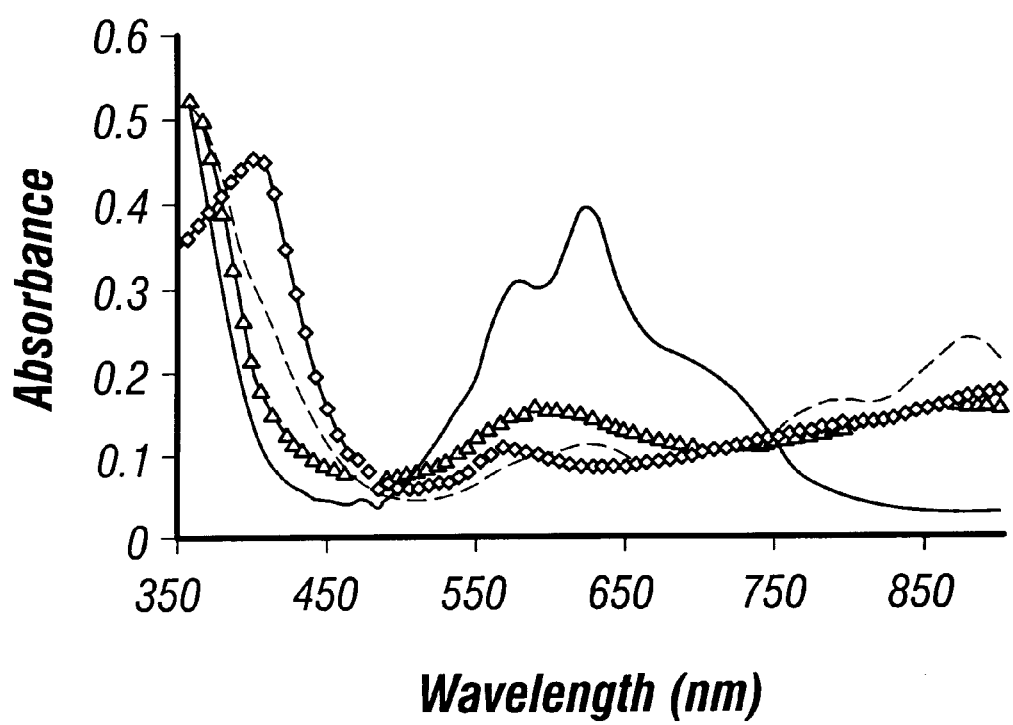

FIG. 4.—Absorption spectra of different oxidation states of a thin polymer film on ITO: neutral (-), oxidized (•), reduced at −1.1 V ( - - - ), and reduced at −1.4 V (0).

FIG. 5.—Monomers usable to form electrochromic and electroactive polymers.

DESCRIPTION OF ILLUSTRATIVE EMBODIMENTS

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Figure 1:
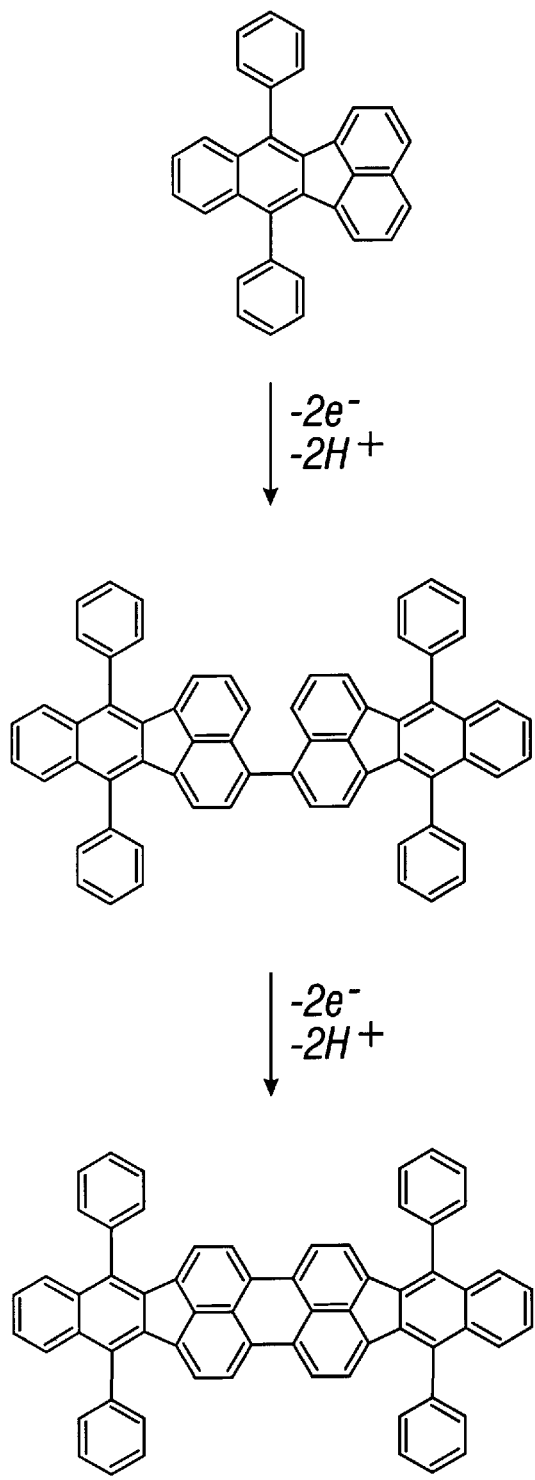
FIG. 1 shows (Scheme 1) illustrating dimerization of fluoranthene derivatives.

A few purely hydrocarbon polycyclic aromatic polymers have been prepared on suitable electrode surfaces by the electropolymerization of aromatic monomers. Polymers of naphthalene (Satoh et al., 1986), fluorene, fluoranthene, triphenylene, pyrene (Waltman and Baargon, 1986; Waltman et al., 1985), and azulene (Waltman and Baargon, 1986; Bargon et al., 1983) have been prepared for conductivity studies. The structures of these polymers are ill-defined, mainly because of their insolubility, but also because oxidative coupling can occur at a number of different positions on the aromatic monomers, leading to unpredictably branched systems that are difficult to characterize. The mechanism of these polymerization reactions entails radical cation coupling, a process the present inventors have recently studied in detail for a unique dimerization reaction (Debad et al., 1997). In this work, oxidation of a fluoranthene derivative causes a dimerization reaction to occur in which two carbon-carbon bonds form between the naphthalenic ends of two monomer units, producing a much larger polyaromatic compound with a perylene core (FIG. 1, FIG. 1, Scheme 1). As shown, the dimerization reaction proceeds through an intermediate containing a single bond between monomer units, which undergoes intramolecular oxidative coupling to form the ultimate product. This reaction is high yielding and regiospecific, since the coupling reactions proceed through the sites of highest electron density for the radical cations, while other highly reactive sites are blocked by the phenyl substitutents (Plummer et al., 1993). The inventors now show that if a polyaromatic molecule containing two such reactive sites was oxidized, similar oxidation chemistry would lead to ladder-type polymers with large, extended π systems. Here the inventors report their studies of an acenaphthofluoranthene derivative that displays this reactivity and forms an electroactive polymer upon oxidation that contains sections of rigid ladder structure. The electrochemical and electrochromic properties of the polymer have been investigated.

One important embodiment of the present invention concerns the electropolymerization of acenaphtho[1,2-κ] fluoranthene derivatives and formation of an electroactive and electrochromic hydrocarbon polymer.

Experimental

Tetra-n-butylammonium hexafluorophosphate (TBAPF$_6$) (SACHEM, Austin, Tex.) was recrystallized from EtOH/H$_2$O (4:1) twice and dried at 100° C. before use. Dimethylformamide (DMF), benzene (Aldrich, anhydrous), and MeCN (Burdick and Jackson, UV grade) were used as received after being transported unopened into an inert atmosphere drybox (Vacuum Atmospheres). Bis(1,5-cyclooctadiene)nickel(0) (Johnson Matthey), bromine, acenapthylene, 2,3-dichloro-5,6-dicyano-1,4-benzoquinone (DDQ), 1,3-diphenylacetone (Aldrich), and acenaphthenequinone (Lancaster) were used as received.

NMR spectra were recorded on a Varian Unity Plus 300 spectrometer as solutions in deuterochloroform (CDCl$_3$). Chemical shifts are expressed in parts per million (ppm, δ) downfield from tetramethylsilane (TMS) and are referenced to CDCl$_3$ (7.24 ppm) as internal standard. Exact mass determinations were obtained on a VG analytical ZAB2-E instrument. Fluorescence spectra were recorded on a SLM Aminco SPF-500 spectrofluorometer, and UV spectra were recorded on a Milton Roy Spectronic 3000 array spectrophotometer.

A Model 175 universal programmer and a Model 173 potentiostat (Princeton Applied Research) were used for electropolymerization. Cyclic voltammograms were recorded on a Model 660 electrochemical workstation (CH Instruments). The working electrode consisted of either an inlaid platinum disk or indium tin oxide-coated (ITO) glass ($R_3 \leq 40$ Ω/cm$^2$, Delta Technologies, Minn.). Platinum gauze served as a counter electrode, and a silver wire was utilized as a quasi-reference electrode which was calibrated vs SCE by the addition of ferrocene as an internal standard using E°(Fc/Fc$^+$)=0.424 V vs SCE.

7,14-Diphenylacenaphtho[1,2-κ]fluoranthene (1). This compound was prepared by a route similar to those previously reported (Allen, 1962; Tucke, 1958; Dilthey et al., 1938). The cyclopentadienone intermediate was prepared by refluxing 1,3-diphenylacetone (3.72 g, 17.7 mmol) and acenaphthenequinone (3.23 g, 17.7 mmol) in ethanolic KOH for 6 h. The solvent was removed under vacuum, and the residue was dissolved in CH$_2$Cl$_2$ and filtered (the cyclopentadienone can be isolated at this step by addition of pentane to the filtered solution to precipitate the compound; however, isolation is not required for the following preparation). The solvent was removed and acenaphthylene (2.70 g, 17.8 mmol) and xylenes (40 mL) were added and the resulting solution was refluxed for 2 days. The solvent was removed by distillation and the residue was placed under vacuum to remove unreacted acenaphthylene. DDQ (4.0 g, 18 mmol) and enough CH$_2$Cl$_2$ to dissolve the residue were added and the solution was stirred at 45° C. for 1 h. The solution was filtered through silica (3 cm) and the solution volume was reduced under vacuum. The product precipitated as yellow crystals, which were isolated by filtration. The supernatant was reduced further and cooled to induce more product to crystallize (5.15 g total, 61%). The compound was recrystallized from toluene before use in electropolymerization studies.

3,10-Dibromo-7,14-diphenylacenaphtho[1,2-κκ] fluoranthene (2). 1 and 2.5 equivalents of bromine were stirred under reflux in CH$_2$Cl$_2$ until the starting material was consumed, as judged by TLC (~4 h). The solvent was removed under vacuum to leave a bright yellow solid which was used without further purification. $^1$H NMR (300 MHz, CDCl$_3$) δ6.47 (2H, d, J=7.5 Hz, H$_{2,9}$), 6.70 (2H, d, J=6.9 Hz, H$_{4,11}$), 7.37 (2H, vt:, J=8 Hz, H$_{5,17}$), 7.53 (2H, d, J 7.8 Hz, H$_{1,8}$), 7.6 (4H, m, phenyl), 7.7 (6H, m, phenyl), 7.88 (IH, d, J=7.8 Hz, H$_{6,13}$). MS (CI+) 637 (M$^+$+1), 556 (M+—Br). EA calcd for C$_{38}$H$_{20}$Br$_2$ C:71.72, H:3.17, Br:25.11. Found C:71.73, H:3.18, Br:25.05.

Poly(3,10-(7,14-diphenylacenaphtho[1,2-κ] fluoranthene)) (3). 2 (150 mg, 0.24 mmol) and bis(1,5-cyclooctadiene)nickel(0) (70 mg, 0.25 mmol were dissolved in DMF (350 mL) in a glove box. Benzene (100 mL) was added to improve the solubility of the products and the solution was heated in a sealed vessel at 55° C. for 6 days with constant stirring. HCl (5 mL, 0.2 M) was then added and the solution was stirred for 1 h, at which time 300 mL of water was added. The benzene layer was separated, dried (MgSO$_4$), and filtered, and the solvent was evaporated. An equivalent volume of hexanes was added, and the solution was passed through 10 cm of silica. The column was washed with benzene:hexanes (1:1) until the eluate was nearly colorless, and the solvent was removed from the combined filtrates to leave a yellow-orange powder. This was dissolved in 5 mL of benzene, and 10 mL of MeCN were added dropwise with vigorous stirring to precipitate the longer oligomers. After isolating the precipitate, the procedure was repeated once more, and the product was dried under vacuum (15 mg, 13%). The oligomers could be separated using TLC (CH$_2$Cl$_2$/hexanes, 1:2) so that the degree of polymerization could be identified by mass spectrometry, and the relative amounts of each oligomer could be determined by fluorescence spectroscopy. The oligomers ranged from n=0 to n=8 (FIG. 2, Scheme 2), with an average degree of polymerization of 6 (i.e., n=4), UV (CHCl$_3$) 322, 451 nm. $^1$HNMR (300 MHz, CDCl$_3$) δ7.7 (7H, m), 7.42 (1H, br d), 7.35 (2H, m), 7.50 (2H, br t), 6.8 (1H, m), 6.7 (2H, m). MS (CI+) examples: n=4:2861 (M$^+$); n=3:2385 (M$^+$).

Electropolymerization of 7,14-Diphenylacenaphtho[1,2-κ] fluoranthene (1).

From Solution. Due to the low solubility of 1 in acetonitrile, electrochemical and electropolymerization experiments were performed m a mixture of benzene and acetonitrile (5:1). Solutions used for electropolymerization consisted of the monomer (1) in benzene/MeCN (5:1) containing 0.2 M TBAPF$_6$. The concentration of monomer depended upon the type of film required; homogeneous thin films were best prepared using low concentrations (0.5 mM), while 5 mM solutions were used to produce bulk polymer. The electropolymerization cell contained two compartments separated by a fine glass frit. The working electrode was placed in one compartment along with a silver wire quasi-reference electrode that was contained inside a small fritted glass tube. The counter electrode was a large platinum mesh. Polymer was deposited on the working electrode by repeatedly sweeping the potential from 0 V to the oxidation peak of the monomer (~6 V) and back using scan rates of 100–200 mV/s. The solution became green during the experiments, and a TLC of the resulting solution showed the presence of oligomers (3) that were fluorescent yellow and other blue and purple products, some of which appeared fluorescent red under a hand-held UV lamp. The polymer-coated electrode was washed in MeCN after removal from the electropolymerization cell. Bulk material was produced by using large ITO electrodes, from which the polymer was mechanically removed. This material was washed in electrolyte solution, MeCN, benzene, and then dried under vacuum before analysis. EA: found, C: 84.4, H: 4.7, N:0.87.

From a Solid Film. Films of 1 were spin-coated onto a clean ITO surface and immersed in an MeCN/TBAPF$_6$ solution. 1 is slightly soluble in MeCN, and therefore the electropolymedzation solution was saturated with 1 before immersion of the film-coated electrode to decrease dissolution of the film before application of the potential (electropolymerization of the monomer directly from the saturated solution onto a clean electrode is not observed due to the low concentrations involved). The yellow film of 1 was polymerized by scanning the potential as described for the solution studies until no further growth of the polymer was observed.

Electropolymerization of Poly(3,10-(7,14-diphenylacenaphtho[1,2-κ]fluoranthene)). The same procedures used to polymerize 1 from solution or the solid state were used to electropolymerize these oligomers. The electrochemistry of the polymer thus formed was identical to that of the polymer obtained from the monomer.

1,4,9,12-Tetraphenyldiacenaphtho[b,p]periflanthene (4). Small amounts of this product were isolated from solutions used for the electropolymerization of 1. Best results were obtained when these solutions were further electrolyzed at 1–6 V until the solution became blue and no monomer remained, whereupon the solvent was removed and the residue chromatographed on silica (20 cm column) using CHCl$_3$/hexanes (1:2) to elute. Compound 4 appeared as a purple band. The low solubility and the small amounts isolated prevented complete characterization. UV (CHCl$_3$): 340, 520, 555, 601 nm. Fluorescence (CHCl$_3$, $\lambda_{ex}$=555 nm): 640 nm. HRMS (CI+) calcd for C$_{76}$H$_{40}$:952.3130 (M+). Found: 952.3110.

Results and Discussion

Synthesis and Characterization of Polymer Films. Molecular orbital calculations (Plummer et al., 1993) performed on acenaphtho[1,2-κ]fluoranthene reveal that the highest occupied molecular orbital for the compound is located mainly on the central (positions 7 and 14, see FIG. 2, Scheme 2) and end carbons (positions 3,4, 10, and 11); so reactions of the radical cation of the compound, such as intermolecular coupling, would be expected to occur primarily at these positions. However, substitution of the central 7 and 14 hydrogens with alkyl or aryl groups prevents reactions at these carbons and directs reactivity of the radical cation toward the two ends of the molecule, allowing for the possibility of producing linear polymers via an oxidative coupling route. The phenyl derivative, 7,14-diphenylacenaphtho[1,2-κ]fluoranthene (1, FIG. 2, Scheme 2), was used in this study because it is easily prepared on the gram scale, as described in the Experimental Section. 4,7-Dialkyl derivatives are also accessible, and initial studies on the 7,14-dioctyl species indicate that the reactivity of the dialkyls is similar to that of the diphenyl derivative discussed below.

Figure 3A:
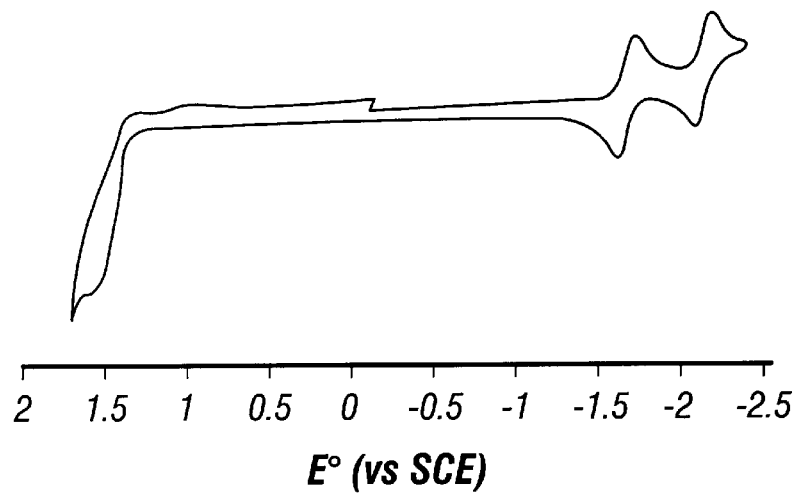
FIGS. 3A–3C Cyclic voltammograms of (FIG. 3A) 1 in benzene:MeCN (4:1), 0.2 M TBAPF$_6$, at 200 mV/s, (FIG.

The cyclic voltammogram of 7,14-diphenylacenaphtho[1, 2-κ]fluoranthene (1) is shown in FIG. 3A (Due to the low solubility of 1 in acetonitile, electrochemical and electropolyrmerization experiments were performed m a mixture of benzene and acetonitrile (5:1).). Two symmetric reduction waves are observed at E°=−1.62 V and −2.07 V, indicating that the radical anion and dianion of the molecule are stable in this medium. In contrast to the reduction processes, the oxidation wave (E$_{pa}$=+1.6 V) is irreversible (Plummer et al., 1993), indicating that the radical cation, 1·+, is not stable and quickly undergoes a chemical reaction once it is formed at the electrode surface. By analogy with results in a previous study (Debad et al., 1997), this process involves coupling between electrogenerated 1·+, a process common to many aromatic species and one exploited for the electrogeneration of their polymers.

Figure 3B:
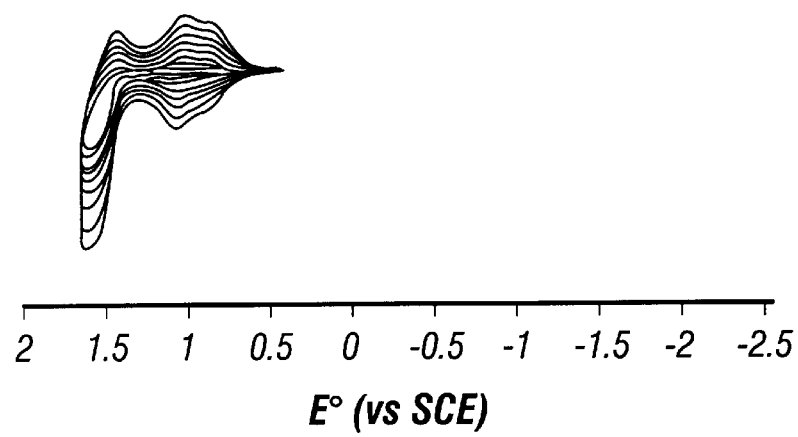

When the potential of the electrode in the above electrochemical study was cycled between 0 V and the oxidation wave for 1, a broad reversible reduction wave grew with time and a blue electroactive film was deposited on the electrode (FIG. 3B). The thickness of this deposit could be controlled by varying the number of scans or the concentration of 1. The thin films adhered well to platinum or ITO electrodes and appeared homogeneous and transparent, although under magnification it was clear that they were coarse and porous. Thicker films tended to become powdery and eventually fell from the electrode. An alternative and much more convenient route to forming thin films of this material was by the direct oxidation in MeCN of a solid film of 1 coated on the electrode surface. Application of a potential large enough to oxidize the monomer caused the deposition of a blue film that had identical characteristics to those produced by electropolymerization of 1 from solution.

Figure 2:
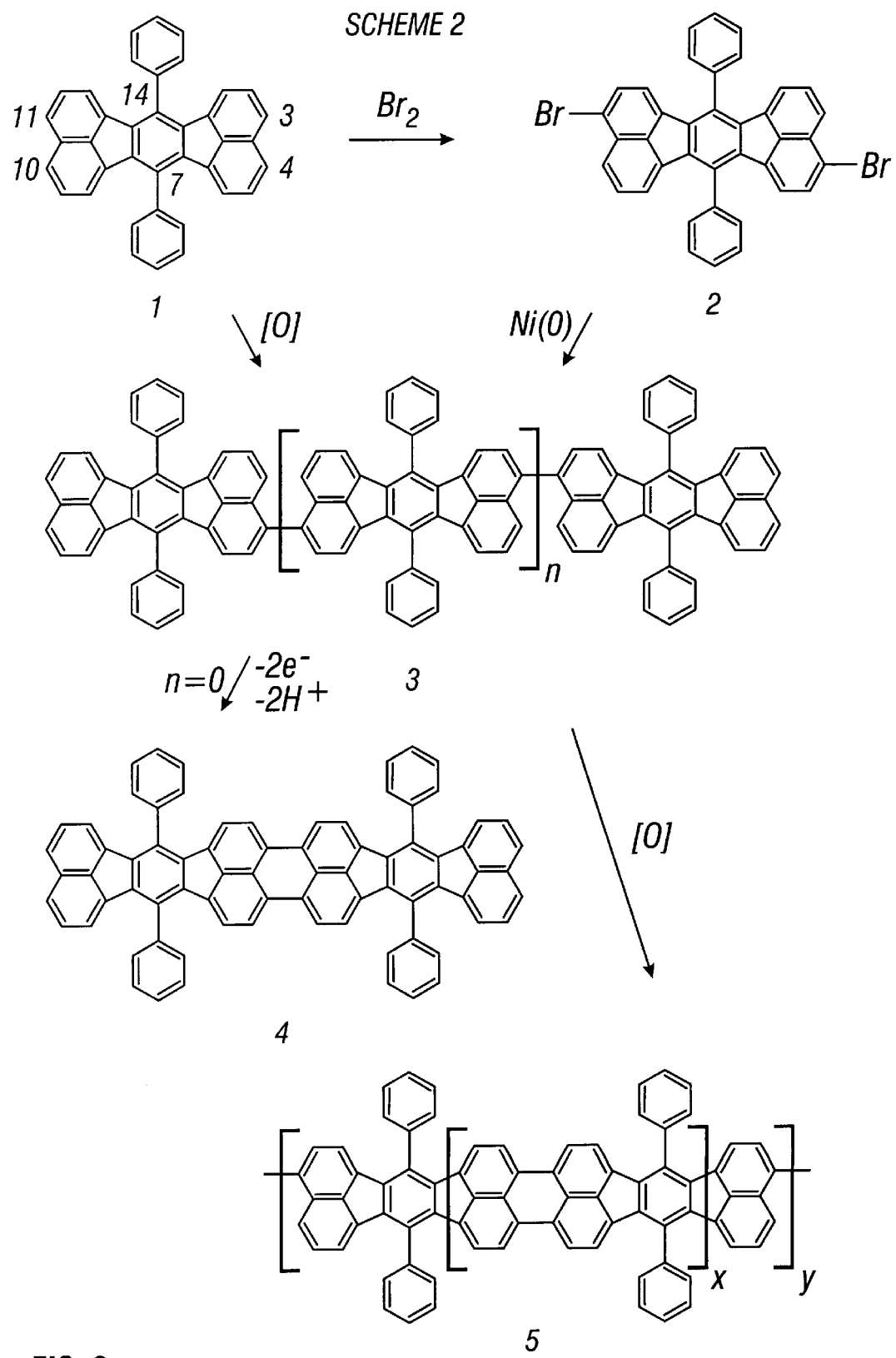
FIG. 2 shows (Scheme 2) illustrating pathways for polymerizing fluoranthene derivatives.

Thin layer chromatography of solutions that were used for electrodeposition studies revealed that many new solution species form upon oxidation of 1. A series of yellow compounds exhibiting yellow-green fluorescence were identified as poly(3,10-(7,14-diphenylacenaphtho[1,2-κ] fluoranthene)) oligomers (3, FIG. 2, Scheme 2) by comparison to identical compounds synthesized by nickel(0) catalyzed polymerization of the 3.10-dibromo derivative of 1 (FIG. 2, Scheme 2). These oligomers themselves constitute an interesting example of highly fluorescent and very soluble macromolecules, and the inventors are investigating their properties further. The oligomers were formed electrochemically by the oxidative coupling of the 1·+ species by analogy to oligomerizations observed during the electropolymerization of many aromatic compounds (Waltman and Bargon, 1986). The electrodeposition of the blue, insoluble films probably proceeds through the initial formation of these oligomers near the electrode surface, since in separate studies the oxidation of the pure oligomers led to the deposition of films with identical properties to those formed by oxidation of 1.

Purple and blue compounds were also produced in solution during electropolymerization of 1. One of these species was isolated using chromatography and was identified as the dimer 4 (FIG. 2, Scheme 2) by high resolution mass spectrometry. The highest wavelength absorption peak of 4 is located at 601 nm, and the compound fluoresces with a maximum at 640 nm. The formation of this compound is analogous to the reaction of fluoranthene derivatives (Debad et al., 1997) (FIG. 1, FIG. 1, Scheme 1), such that oxidation of the singly-bound dimer (3, n=0) triggers an intramolecular coupling process, forming a second carbon-carbon bond to generate the fully aromatic product. The other blue and purple species formed in solution during the oxidation of 1 were undoubtedly oligomers (3) that had undergone this intramolecular coupling in at least one position along the chain or compounds formed by the polymerization of ladder species such as the dimer, which should also be prone to intermolecular oxidative coupling. Many of these species fluoresce real under illumination, similar to the dimer 4.

The polymer obtained from the oxidation of 1 is believed to possess a structure like that of 5 shown in FIG. 2, Scheme 2. Further oxidative coupling within the oligomers (3) that were initially formed at the electrode led to planar sections of ladder structure that eventually became insoluble and precipitated onto the electrode surface. The insolubility of the film precluded complete characterization; however, spectroscopic data supports this assignment. A thin film of the polymer deposited on ITO absorbed light up to 800 nm (FIG. 2), which is red shifted from that of the starting monomer ($\lambda_{max}$=425 nm) and indicates the presence of large chromophores. The polymer absorption is also at much lower energy than the dimer 4, which absorbs to only 620 nm, indicating that the polymer contains sections of ladder structure made up of more than two monomer sections in length. This trend was mirrored in the fluorescence data of the dimer and of the polymer. The solid polymer fluoresces with a maximum of 750 nm, while the dimer emits at a maximum wavelength of only 640 nm, again indicating the presence of long ladder structures within the polymer.

Figure 3C:
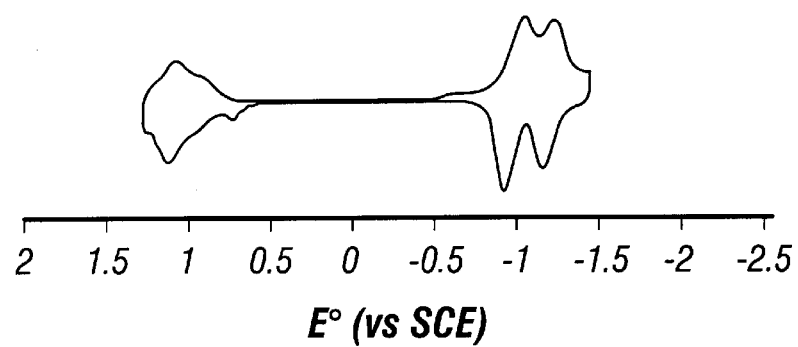

Electrochemistry and Electrochromism of the Polymer Films. A representative voltammogram of a thin polymer film deposited on ITO by cycling the potential through the oxidation of the monomer 1 in solution is shown in FIG. 3C. Identical electrochemistry was observed for films produced from solutions of the oligomers (3) or from polymerization of solid films of 1 or 3. The film exhibited an oxidation at E°=+1.25 V, and two reduction waves at −0.88 V and −1.12 V. The shapes of the waves are typical for solid-state redox processes, as demonstrated by the small $\Delta E_p$, although thicker films have larger $\Delta E_p$ values and broader peaks due to impeded ion flow into and out of the film. Another oxidation and more reduction features were observed by sweeping to potentials greater than those shown in the figure; however, this led to loss of material from the electrode. The waves shown in FIG. 3C are due to the longest ladder sections within the polymer, while shorter ladder sections are presumably responsible for the redox processes at higher or lower potentials.

These electrodeposited polymer films were very stable to repeated reduction when care was taken to remove oxygen and water from the system. Under these conditions, the films could undergo at least 20,000 cycles through both reduction peaks (Scanning from 0 V to −1.4 V (past the second reduction wave) at 500 mV/sec in acetonitrile/TBAPF$_6$ solution. The acetonitrile was vacuum transferred from P$_2$O$_5$.) with no change in the shape of the voltammetric features. A small decrease in the amount of charge incorporated into the film occurred during the first 10,000 scans, but negligible loss was seen throughout the next 10,000 scans. This initial loss is presumably due to the dissolution of lower molecular weight species that become soluble when charged. Repeated cycling to +1.4 V to test the stability of the oxidized film, however, resulted in a change in the size and shape of the oxidation wave, although several hundred cycles were required for any noticeable change. Loss of charged material from the electrode or further oxidative processes occurring within the film such as cross-linking could account for these observations.

The thin films formed by electropolymerization of compound 1 are transparent blue and exhibit dramatic color changes when oxidized or reduced. Electrochemical oxidation in an MeCN solution initiates a rapid color change to pale grey, while reduction to the first or second reduction waves causes the film to become pale green or pale orange, respectively. Absorption spectra recorded for the neutral, oxidized, and both reduced forms of the polymer are shown in FIG. 4. The large decrease in the amount of visible light absorbed by the polymer upon charging accounts for bleaching of the deep blue color.

Although similar electrochromic behavior would be expected from electropolymerized films of other polyaromatic hydrocarbons, this appears to be the only example of this type of polymer to show such electrochromism. The extended aromatic structure of the polymer should induce a high stability to the material, and the neutral polymer was consistently stable in air for at least months. However, rather high oxidation and reduction potentials make it less likely that the charged states of the polymer would be stable to oxygen or water. Although under anhydrous and anaerobic conditions, as discussed above, these films could be repeatedly reduced without decomposition. The electrochromic nature of the polymer was also stable under these conditions, and films deposited on ITO still exhibited a strong color change after 30,000 reduction cycles in MeCN.

Electrooxidation of 1 in benzene/MeCN (5:1) containing 0.2 M TBAPF$_6$ produces an electroactive, deep blue polymer film on the electrode surface. The polymer film shows two reversible reduction waves in MeCN/0.1 M TBAPF$_6$ which cause color changes to light green at the first wave and to orange at the second. The polymer oxidizes in a broader reversible wave to a pale gray film. The film is very stable to repeated reductive scans but shows slow decomposition on repeated oxidations. The neutral polymer film fluoresces red with a maximum at 750 nm. In addition to its interesting electrochromic properties, this material is useful in electroluminescent devices and in electrogenerated chemiluminescence. Such studies are now under further investigation.

Basically any molecule comprising the fluoranthene structure:

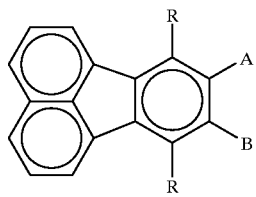

where R is defined as in FIG. 5 and A and B are a naphthalenic or related structures as mentioned elsewhere herein.

will function to electrolytically form electroactive and electrochromic polymers as described above for the fluoranthene. Examples of usable monomers are shown in FIG. 5.

All of the compositions, methods and/or apparatus disclosed and claimed herein can be made and executed without undue experimentation in light of the present disclosure. While the compositions and methods of this invention have been described in terms of preferred embodiments, it will be apparent to those of skill in the art that variations may be applied to the compositions, methods and/or apparatus and in the steps or in the sequence of steps of the method described herein without departing from the concept, spirit and scope of the invention. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the invention as defined by the appended claims.

REFERENCES

The following references, to the extent that they provide exemplary procedural or other details supplementary to those set forth herein, are specifically incorporated herein by reference.

*Handbook of Conducting Polymers;* Skotheim, T. A. Ed.; Marcel Dekker: New York, Vol. 1, 1986.

Allen, *Chem. Rev.*, 62:653, 1962.

Bargon, Mohamand, Waltman, *IBM J. Res. Develop.*, 27:330, 1983.

Debad, Morris, Magnus, Bard, *J. Org. Chem.*, 62:530, 1997.

Dilthey, Henkels, Schaefer, *Chem. Ber.*, 71:974, 1938.

Gustafsson, Cao, Treacy, Klavetter, Colaneri, Heeger, *Nature*, 357:477, 1992.

Monk, Mottimer, Rosseinsky, *Electrochromism Fundamentals and Applications:* VCH Publishers: New York, 1995.

Novák, Müller, Santhanam, Hass, *Chem. Rev.*, 97:207 1997.

Pethrick, *Conducting Polymers, In: Desk Reference of Functional Polymers Synthesis and Applications,* Arshady, R, Ed., American Chemical Society: Washington, D.C., 1997; and references therein.

Plummer, Steffen, Braley, Resse, Zych, Van Dyke, Tulley, *J. Am. Chem. Soc.*, 115:11542, 1993.

Satoh, Uesugi, Tabata, Kaneto, Yoshino, *Chem. Soc., Chem. Comm.*, 550, 1986.

Schlüter, Löffler, Godt, Blatter, *Perfect Diels-Alder Ladder Polymers: Precursors for Extended π-Conjugation In Desk Reference of Functional Polymers Synthesis and Applications,* Arshady, R., Ed.; American Chemical Society: Washington, D.C., and references therein., 1997.

Tucke, *Chem. Soc.*, 1462, 1958

Waltman and Baargon, *J. Can. J. Chem.*, 64:76, 1986.

Waltman and Diaz, Bargon, *J. J. Electrochem. Soc.*, 132:631, 1985.

Waltman and Bargon, *Can. J. Chem.*, 64:76, 1986.

Yamarnoto, Wakayama, Fulcuda, Kanbara, *Phys. Chem.*, 96:8677, 1992.

What is claimed is:

1. A polymer produced by the electropolymerization of a substituted fluoranthene on a conductive surface.

2. The polymer of claim 1 where the fluoranthene is 7,14-diphenylacenaphtho[1,2-κ]fluoranthene (1).

3. The polymer of claim 1 where the fluoranthene is 1,4,9,12-tetraphenyldiacenaphtho[b,p]periflanthene (4).

4. The polymer of claim 1 where the fluoranthene is poly (3,10-(7,14-diphenylacenaphtho[1,2-κ]fluoranthene)).

5. The polymer of claim 1 where the conductive surface is platinum or indium tinoxide.

6. The polymer of claim 1 defined further as being fluorescent, electrochromatic, or electroactive.

7. The polymer of claim 1 where the fluoranthene is at least one compound having a structure shown in FIG. 5.

8. The polymer of claim 1 defined further as being in the form of a film on the conductive surfaces.

9. An electroactive and electrochromatic hydrocarbon polymer having the structure:

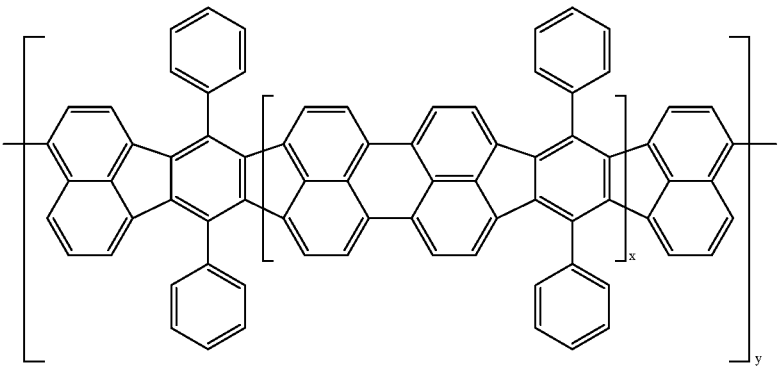

where x and y are independently from about 2 to about 100.

* * * * *